(12) United States Patent     (10) Patent No.:     US 12,700,232 B2

Hager     (45) Date of Patent:     Aug. 4, 2026

(54) AUTOMATED IDENTIFICATION OF FISH FILETS

(71) Applicant: Vesper Marine Holdings, LLC, Portland, ME (US)

(72) Inventor: Mark William Hager, Middleboro, MA (US)

(73) Assignee: Vesper Marine Holdings, LLC, Portland, ME (US)

( * ) Notice: Subject to any disclaimer, the term of this patent is extended or adjusted under 35 U.S.C. 154(b) by 872 days.

(21) Appl. No.: 17/910,648

(22) PCT Filed: Mar. 12, 2021

(86) PCT No.: PCT/US2021/022081

§ 371 (c)(1),
(2) Date: Sep. 9, 2022

(87) PCT Pub. No.: WO2021/183865

PCT Pub. Date: Sep. 16, 2021

(65) Prior Publication Data

US 2023/0133356 A1     May 4, 2023

Related U.S. Application Data

(60) Provisional application No. 62/989,272, filed on Mar. 13, 2020.

(51) Int. Cl.
G06K 9/00 (2022.01)
G06F 18/214 (2023.01)
(Continued)

(52) U.S. Cl.
CPC ............ G06V 20/20 (2022.01); G06F 18/214 (2023.01); G06F 18/24 (2023.01); G06V 10/17 (2022.01); G06V 20/68 (2022.01); G06V 2201/10 (2022.01)

(58) Field of Classification Search
CPC .... G06F 16/634; G06F 16/635; G06F 16/639; G06F 16/683; G06F 16/48; G06F 18/217;
(Continued)

(56) References Cited

U.S. PATENT DOCUMENTS

2014/0164375 A1* 6/2014 Persson ................ G06V 40/103
707/736
2017/0202228 A1* 7/2017 Hallvardsson ..... A22C 17/0073

OTHER PUBLICATIONS

Silvia Grassi, Ernestina Casiraghi, Cristina Alamprese, Fish fillet authentication by image analysis, Journal of Food Engineering, vol. 234, 2018, pp. 16-23, ISSN 0260-8774 (Year: 2018).*

* cited by examiner

*Primary Examiner* — Alex Kok S Liew

(74) *Attorney, Agent, or Firm* — Pierce Atwood LLP

(57)     ABSTRACT

One disclosed method involves encoding an acquired image of a fish filet into a first feature vector consumable by at least one predictive model, processing, with the at least one predictive model, the first feature vector to identify a type of fish from which the fish filet was cut, and causing at least one device to output an indication of the type of fish identified by the at least one predictive model. Another disclosed method involves associating first images of fish filets with metadata indicative of one or more types of fish from which the fish filets were cut, using the first images and the metadata to train at least one predictive model to categorize second images of fish filets into the one or more types of fish, and providing the at least one predictive model to at least one device so as to enable the at least one device to output an indication of the one or more types of fish based acquired images of fish filets.

18 Claims, 11 Drawing Sheets

(51) Int. Cl.
    *G06F 18/24*     (2023.01)
    *G06V 10/10*     (2022.01)
    *G06V 20/20*     (2022.01)
    *G06V 20/68*     (2022.01)

(58) Field of Classification Search
    CPC ...... G06F 16/285; G06F 16/637; G06F 18/21;
        G06F 18/24; G06F 18/214; G06F 16/40;
        G06F 16/71; G06F 16/7844; G06F 21/34;
        G06F 3/0484; G06F 40/284; G06F 40/30;
        G06F 40/56; G06F 16/355; G06F 18/22;
        G06F 18/23; G06F 18/254; G06F
        21/6245; G06N 20/00; G06N 3/08; G06N
        3/0464; G06N 3/04; G06N 3/006; G06N
        3/02; G06N 3/0442; G06N 3/09; G06N
        3/092; G06N 3/0985; G06N 20/20; G06N
        3/045; G06N 3/0455; G06N 3/047; G06N
        3/084; G06N 5/02
    See application file for complete search history.

Front end

Back end

AUTOMATED IDENTIFICATION OF FISH FILETS

CROSS-REFERENCE TO RELATED APPLICATIONS

This application claims priority to U.S. Provisional Application No. 62/989,272, entitled AUTOMATED IDENTIFICATION OF FISH FILETS, filed Mar. 13, 2020, the entire contents of which are incorporated herein by reference.

GOVERNMENT LICENSE RIGHTS

This invention was made with government support under grant NA200AR0210334 awarded by the Oceanic and Atmospheric Research (OAR) division of the National Oceanic and Atmospheric Administration (NOAA). The government has certain rights in the invention.

BACKGROUND

In 2017, the United States alone landed 9.9 billion pounds of seafood for a value of over $5.4 billion dollars (NOAA, "Fisheries of the United States," 2017, accessible at the path "/national/sustainable-fisheries/fisheries-united-states" of the uniform resource locator (URL) "https://www.fisheries-.noaa.gov," the entire contents of which are incorporated herein by reference). What's even more astounding is that 10% of people globally rely on seafood for their livelihoods and 4 billion people rely on seafood for a significant portion of their protein intake (UN FAO, "Oceans crucial for our climate, food and nutrition," 2014, accessible at the path "/news/story/en/item/248479/icode/" of the URL "fao.org," the entire contents of which are incorporated herein by reference).

Seafood, being one of the most traded commodities in the world, bears extreme economic value and plays a key role in global food security. Yet, as consumers, we generally lack knowledge about the seafood we eat. Our lack of connection to this major food source is demonstrated by the pervasive occurrence of seafood fraud. In countries like the United States where seafood is often sold in the filet form, there is an incredible amount of illegal mislabeling of market species for economic gain. This is made possible because the average consumer may not be able to determine between fish species in the marketplace, especially in filet form. One seafood fraud study, conducted by Oceana, documented the mislabeling of seafood at 33% in the United States, as follows:

From 2010 to 2012, Oceana conducted one of the largest seafood fraud investigations in the world to date, collecting more than 1,200 seafood samples from 674 retail outlets in 21 states to determine if they were honestly labeled. DNA testing found that one-third (33 percent) of the 1,215 samples analyzed nationwide were mislabeled, according to U.S. Food and Drug Administration (FDA) guidelines.

Mislabeling of seafood can result in lost wages to the honest and hardworking men and women on the water as it becomes difficult to compete with fraudulent species prices. Mislabeling can be detrimental to seafood sustainability as fraud may allow for species of unhealthy fish stocks to continually be harvested and sold. Fraud essentially eliminates the ability of the consumer to make responsible purchases. Finally, mislabeling can be dangerous for consumers as food allergies may be less predictable and responses to foodborne illnesses may be impeded. With 4 billion people relying on seafood worldwide and 9.9 billion pounds landed in the United States, the scale of the economic, environmental and health impacts are immense.

Numerous reports and papers have documented the problem of seafood fraud well. Even the United Stated Food and Drug Administration recognizes this problem and has utilized DNA testing to monitor seafood mislabeling. Regulations for misbranding of seafood exist but are hard to enforce with current technology. This includes regulations against "Offer for sale under another name" which can be found at section 403(a)(1) of the Federal Food, Drug, and Cosmetic (FD&C) Act 21 U.S.C. 343(a).

The FDA website provides evidence of need for action. "DNA Evidence has already been used by FDA in support of enforcement actions against fish wholesalers found to be substituting one fish for another" (FDA, "What Kind of Fish Is That?," 2014, accessible at the path "/consumers/consumer-updates/what-kind-fish" of the URL "https://www.fda.gov," the entire contents of which are incorporated herein by reference). The FDA created a learning module video describing their work to prevent mislabeling of seafood. That video is available at the path "/food/seafood-guidance-documents-regulatory-information/fish-and-fish-ery-products-hazards-and-controls-guidance-learning-module-videos#part3" of the URL "fda.gov." FIG. 1 shows a screenshot from the video. The video demonstrates how difficult it is to distinguish between Cod and Haddock filets. The FDA recognizes that a solution is needed, as FDA Research Biologist Dr. Jonathan Deeds, PhD stated in reference to his DNA filet identification work: "We know that our team's DNA project has immediate practical applications to prevent seafood fraud and increase the safety of seafood."

Recognizing this is not just a problem within the domestic market, the federal government implemented the Seafood Import Monitoring Program (SIMP) in 2018. SIMP required stricter reporting and record keeping requirements for select species being imported into the US, including Cod.

The significance of the problem goes further than the federal government's regulatory authorities and ensuing interests. An Oceana report in 2013 caught the attention of many groups who have worked to highlight the issue further and included academic and private research institutes as well as state agencies. In 2017, researchers from UCLA published a report in Conservation Biology that found more than half of seafood in sushi restaurants was mislabeled (A. Hewitt, "Bait and Switch: UCLA study finds fish fraud runs rampant," 2017, accessible at the path "/releases/bait-and-switch-ucla-study-finds-fish-fraud-runs-rampant" of the URL "newsroom.ucla.edu," the entire contents of which are incorporated herein by reference).

The problem has not been solved. In 2018, the New York office of the attorney general backed up Oceana's report from years earlier with a report that stated 1 in 4 seafood products tested were mislabeled (New York State Office of the Attorney General, "Fish Business: A.G. Underwood Releases Report Detailing Disturbingly High Levels of Seafood Fraud and Mislabeling At New York Supermarkets," 2018, accessible at the path "/press-release/2018/fishy-business-ag-underwood-releases-report-detailing-disturbingly-high-levels" of the URL "ag.ny.gov," the entire contents of which are incorporated herein by reference).

To date, methods of identifying fish in the filet form have been expensive, slow or not convenient, utilizing specialized spectroscopic sensors or specialized DNA analysis hardware.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves encoding an acquired image of a fish filet into a first feature vector consumable by at least one predictive model; processing, with the at least one predictive model, the first feature vector to identify a type of fish from which the fish filet was cut; and causing at least one device to output an indication of the type of fish identified by the at least one predictive model.

In some embodiments, a method involves acquiring, with a mobile device, an image of a fish filet; causing the image to be processed by at least one predictive model to identify a type of fish from which the fish filet was cut; and outputting, with the mobile device, an indication of the type of fish.

In some embodiments, a system may include at least one processor, and at least one computer-readable medium encoded with instructions which, when executed by the at least one processor, cause the system to encode an acquired image of a fish filet into a first feature vector consumable by at least one predictive model, to process, with the at least one predictive model, the first feature vector to identify a type of fish from which the fish filet was cut, and to cause at least one device to output an indication of the type of fish identified by the at least one predictive model.

In some embodiments, a mobile device may include at least one processor, and at least one computer-readable medium encoded with instructions which, when executed by the at least one processor, cause the mobile device to acquire an image of a fish filet, to cause the image to be processed by at least one predictive model to identify a type of fish from which the fish filet was cut, and to output an indication of the type of fish.

In some embodiments, a method may involve associating first images of fish filets with metadata indicative of one or more types of fish from which the fish filets were cut; using the first images and the metadata to train at least one predictive model to categorize second images of fish filets into the one or more types of fish; and providing the at least one predictive model to at least one device so as to enable the at least one device to output an indication of the one or more types of fish based acquired images of fish filets.

In some embodiments, a system may include at least one processor, and at least one computer-readable medium encoded with instructions which, when executed by the at least one processor, cause the system to determine that first images of fish filets are associated with metadata indicative of one or more types of fish from which the fish filets were cut, to use the first images and the metadata to train at least one predictive model to categorize second images of fish filets into the one or more types of fish, and to provide the at least one predictive model to at least one device so as to enable the at least one device to output an indication of the one or more types of fish based acquired images of fish filets.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

The inventor has recognized and appreciated that there is not currently a tool that can accurately identify the types of fish (e.g., species, genera, etc.) from which fish filets have been cut using imagery. Disclosed are novel techniques, devices, and systems for identifying the types of fish from which fish filets were cut that use visible imagery.

Figure 1:
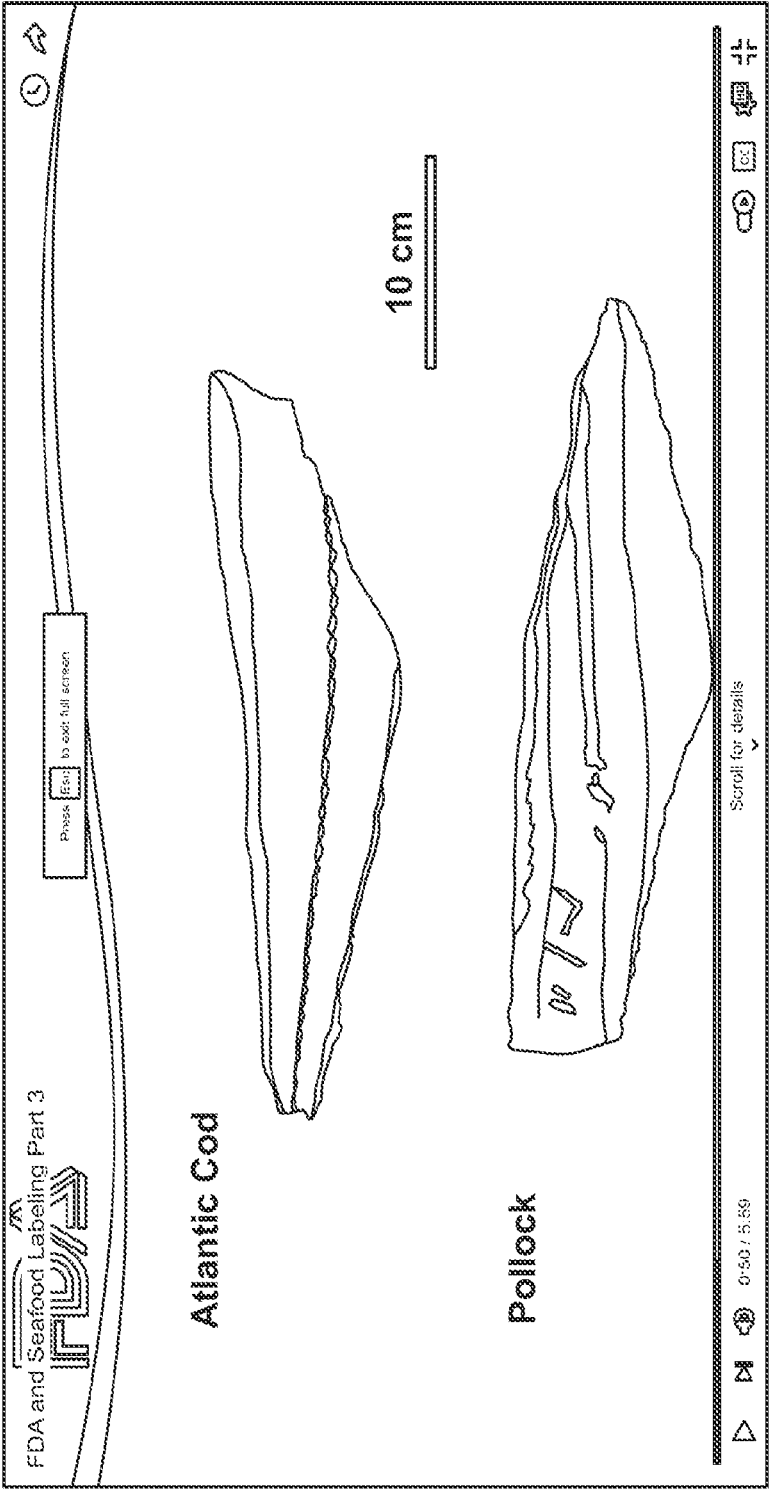
FIG. 1 is a screen shot of a video created by the United States Food and Drug Administration (FDA)
Figure 2:
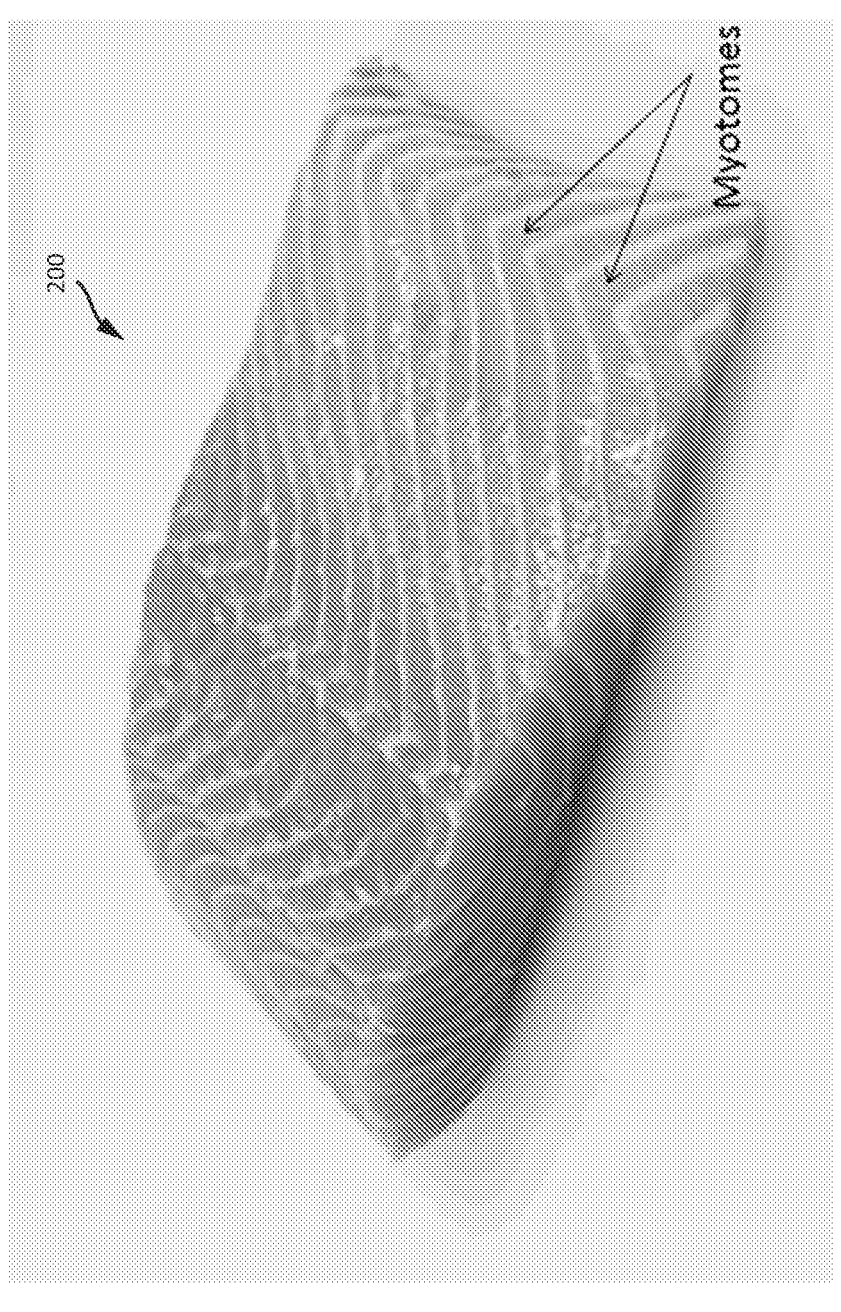
FIG. 2 is an annotated photograph of a fish filet.

The devices, systems, and methods disclosed herein use machine learning (ML) algorithms, built off a robust annotated data set of images, to differentiate between species (or other categorizations of fish, e.g., genera) based on visual imagery cues such as color, shape, size and myotome patterns. Although the following discussion focuses primarily on the identification of species of fish from which fish filets have been cut, it should be appreciated that similar techniques may additionally or alternatively be employed to train and use one or more predictive models to identify fish filets as belonging to other categories of fish, such as genera, families, orders, classes, etc. An image of an example fish filet 200 is show in FIG. 2. As indicated in FIG. 2, myotomes are sheets of muscle separated by connective tissue that make up a pattern on a fish filet. Differences in these patterns may be impossible to decipher even by a trained eye, thus the need for machine learning algorithms. As described in more detail below, during a prototype implementation in which collections of images for three commonly-confused filet types (i.e., Atlantic-Cod, Haddock, and Pollock) were collected and used to train ML models, the ML models were able to accurately identify the species of the filets in other images with nearly 100% accuracy.

Figure 3:
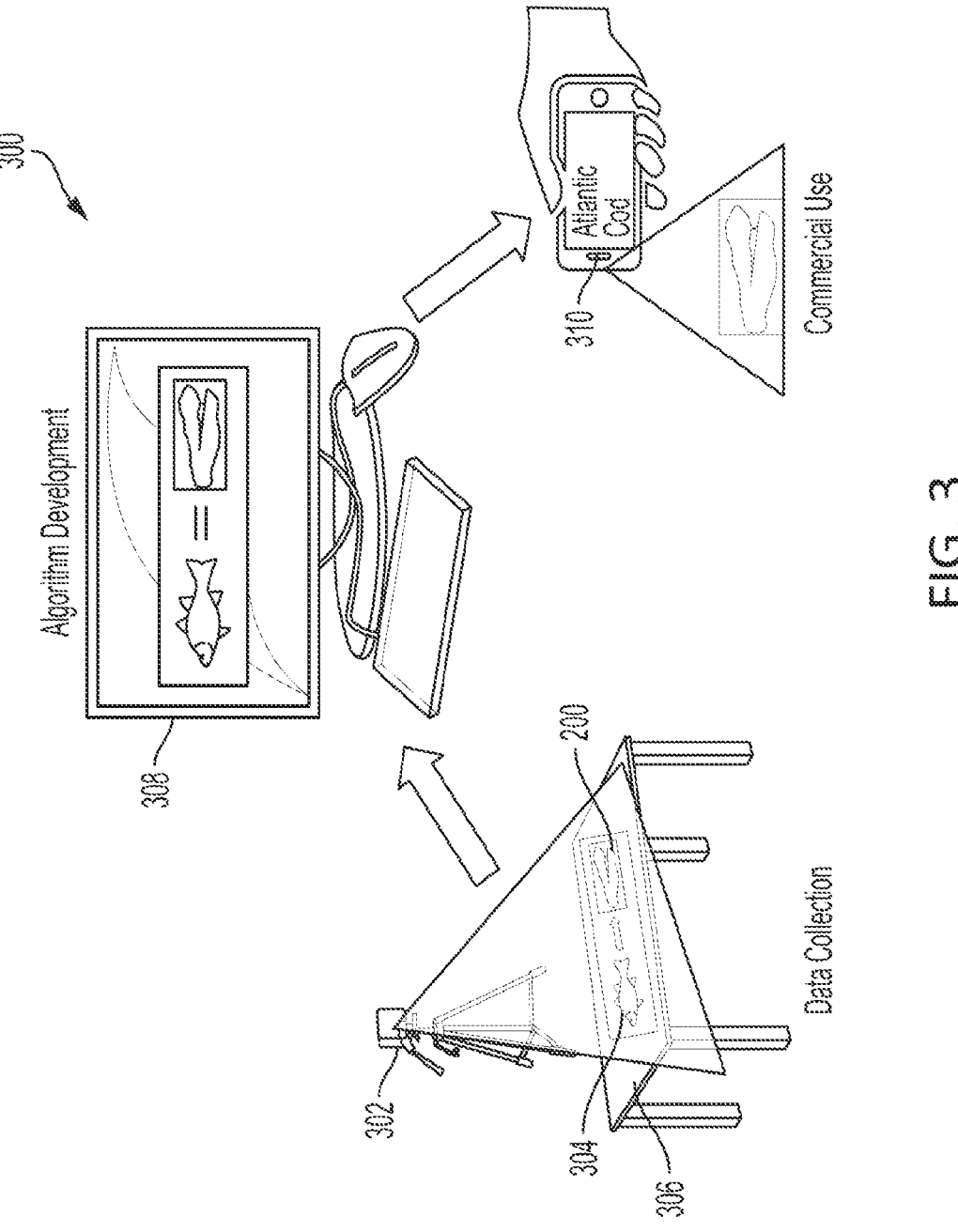
FIG. 3 shows an example process involving various components of an automated filet identification system configured in accordance with some embodiments of the present disclosure.
Figure 7:
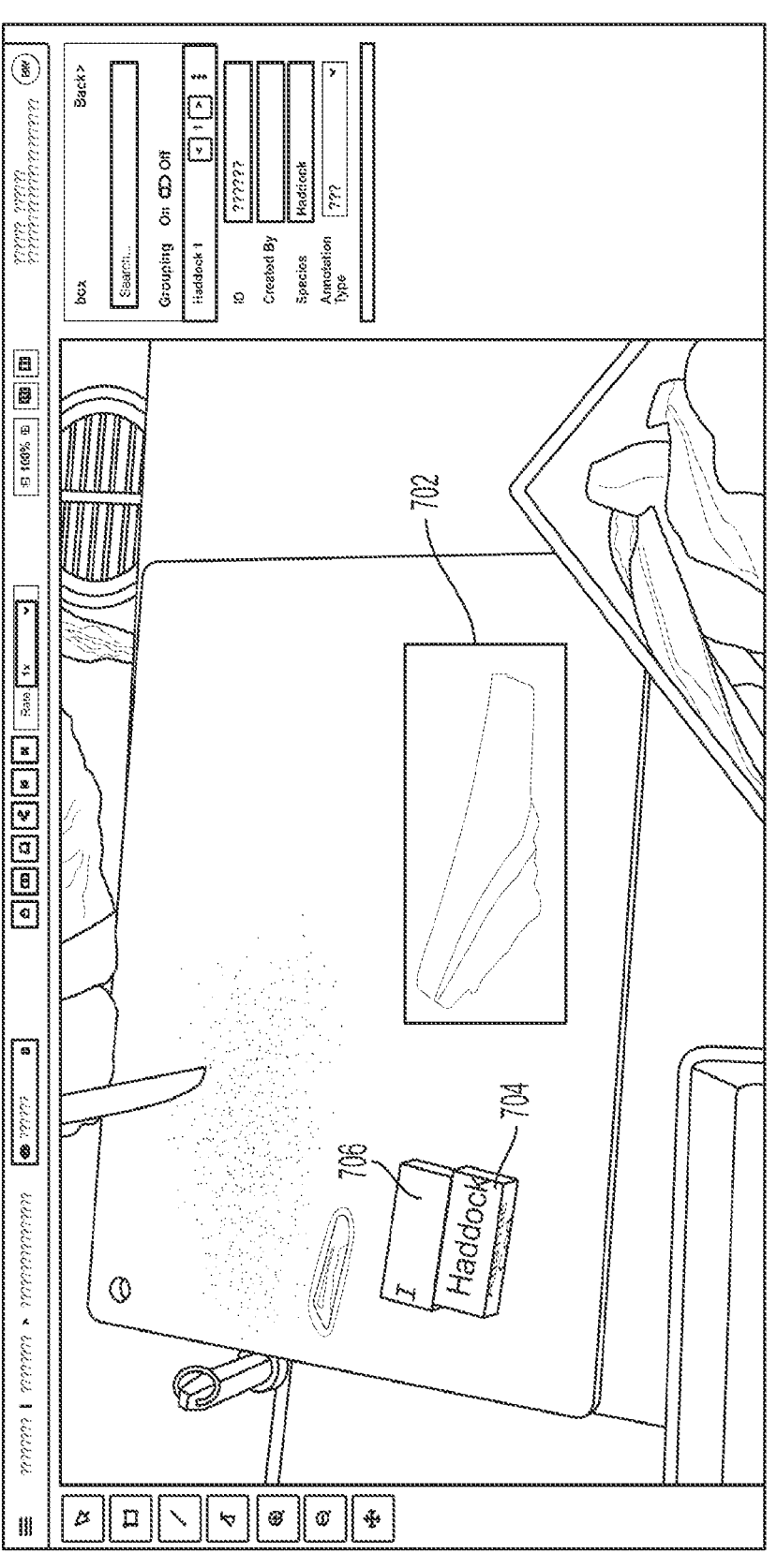
FIG. 7 is an image of a computer screen showing how a screen shot of a fish filet may be identified and tagged as a particular species so it may be used to train one or more predictive models.

FIG. 3 shows an example process involving various components of an automated filet identification system 300 configured in accordance with some embodiments of the present disclosure. As shown, in some implementations, one or more imaging systems 302, e.g., high-resolution cameras, may be set up in commercial fish houses to record high volumes of images of fish filets 200 and to tag those images with indicators of the fish species they represent. In some implementations, to facilitate the image tagging process, the images of filets may be linked to contemporaneously acquired images of the whole fishes 304 from which they are cut. Further, in some implementations, a written label 704 (e.g., as shown in FIG. 7) or other indicia of the species may additionally or alternatively be placed on the table 306 (or at another visible location) as the filet 200 is being cut to facilitate the image tagging process. The acquired images may then be individually tagged. Such tagging may be accomplished either manually or through the use of previously developed whole fish identification software and/or software for recognizing the accompanying label (written or otherwise) as well as tracking software. In either case, a robust data set of filet images that are annotated to the species level may be built. In some implementations, versatile, lightweight, collapsible camera equipment and rigging may be used to provide a non-intrusive yet mobile data collection platform within fish processing facilities.

As described in more detail below, the annotated filet images may then be provided to a computing system 308, which may be the same computing system used to effect the tagging or a different computing system, and the computing system 308 may use the annotated images to train one or more ML models to categorize other images of filets into respective species.

Further, as also described in more detail below, in some implementations, the trained ML model(s) may be transferred to, or operate in conjunction with, an application on a smartphone 310 (or other mobile device) so as to enable it to be used to identify a fish species based on subsequently acquired image data of a filet 200. For example, in some implementations, the user may take a picture of a filet 200 and instantly be provided with a species identification produced by the ML model(s). Such an implementation of the concept may allow for it to become widely available to the seafood supply chain including, seafood companies, restaurants, regulatory agencies, and/or consumers.

To date, fish filet identification has been primarily done by DNA testing. More recently, there have been developments in using spectrometry to fish filet identification. Research and development is concentrated on making these techniques faster, cheaper and easier. Even today, these approaches require specialized equipment and physical sampling from the fish.

In some implementations, the approach to filet identification disclosed herein may be based completely around imagery. Visual characteristics of the filet such as color, shape, evidence of bone structure, and perhaps most importantly patterns formed by myotomes and myocommata may be the primary discriminating attributes. The value proposition is that using imagery to identify fish filets will be faster, cheaper and more convenient. Another key point is that it does not require a physical sample of the filet 200. Further, packaging this into a smartphone application may make it readily available to anyone with a smartphone 310 (or other mobile device). The proposed algorithm and application takes a process that is currently timely, expensive, and inconvenient and brings it to seafood consumers globally at the convenience of a smartphone 310 where it can occur in real time with very little cost.

As noted above, as a result of the disclosed novel data collection technique, a large collection of filet images that are tagged with species identifiers may be acquired. The acquired images and tags may then be used to train one or more predictive models.

Figure 4:
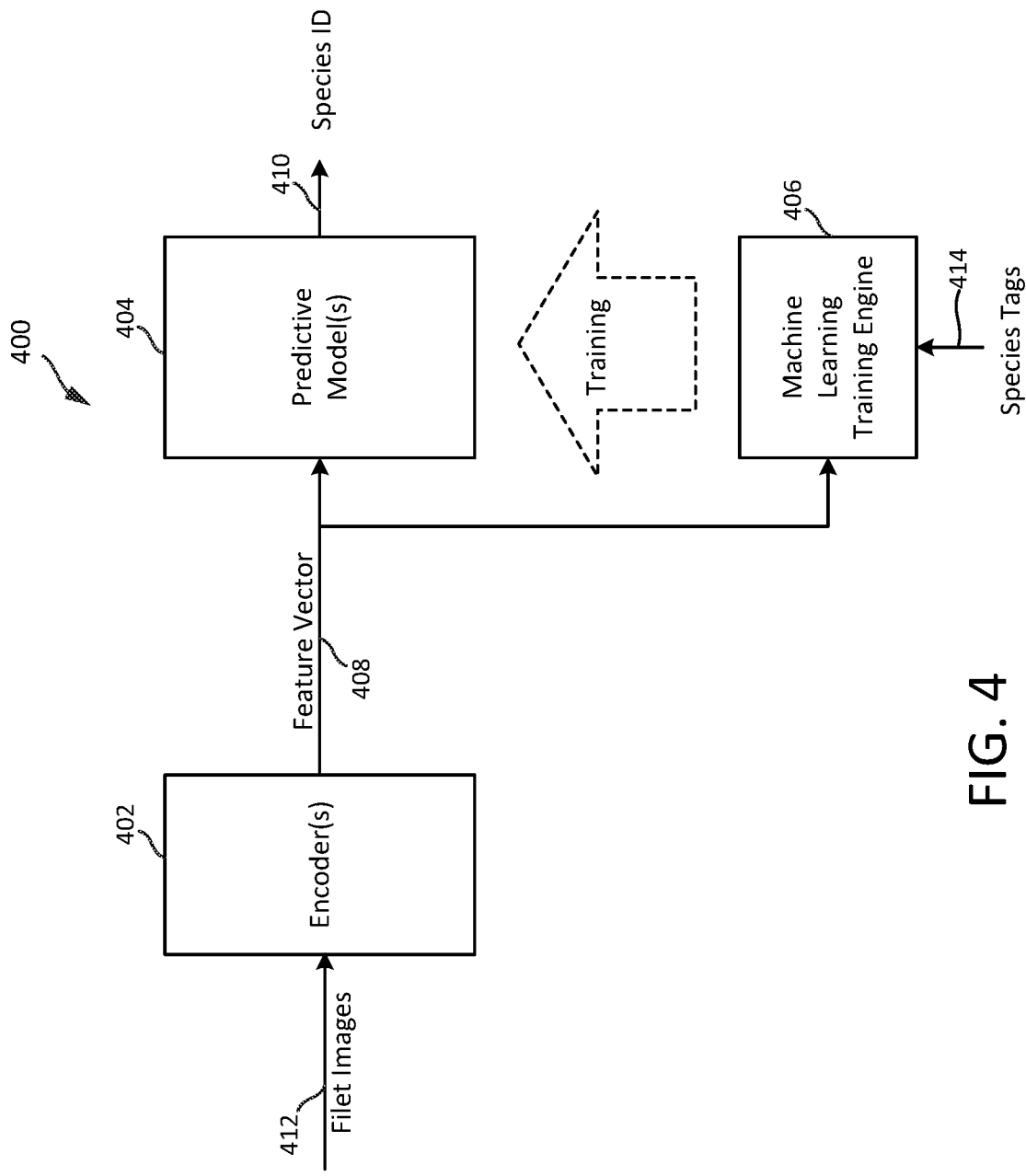
FIG. 4 is a block diagram of a system for training and using one or more predictive models to categorize images of fish filets by the types of fish (e.g., species, genera, etc.) from which the fish filets were cut.

FIG. 4 is a block diagram showing an example implementation of a system 400 for training and using one or more predictive models 404 to identify a fish species in accordance with some embodiments of the present disclosure. As shown, the system 400 may, in some embodiments, include one or more encoders 402, one or more predictive models 404, and a machine learning training engine 406. In some implementations, the predictive model(s) 404 may comprise a multi-classification model that may be trained, e.g., using a machine learning algorithm executed by the machine learning training engine 406, to classify a received feature vector 408 into one of a number of possible categories, which each such category corresponding to a possible species identifier (ID) 410. As illustrated, the encoder(s) 402 may encode data representing acquired filet images 412 into corresponding feature vectors 408.

As shown in FIG. 4, the predictive model(s) 404 may be trained or re-trained by providing feature vectors 408 for respective filet images 412 and corresponding species tags 414 to the machine learning training engine 406 and causing the machine learning training engine 406 to execute its machine learning algorithm using that data. In some implementations, the predictive model(s) 404 may be initially trained using a collected data set that includes feature vectors 408 (or filet images 412 used to generate such feature vectors 408) that have been annotated with corresponding species tags 414, as described above.

An noted, each filet image 412 in the acquired training data set may be processed to obtain a feature vector 408 that may be input to the machine learning training engine 406 along with the corresponding species tag 414. That processing may, for example, involve cropping and rotating the filet images 412 to yield a particular view that is generally consistent across the entire image set and then processing the pixel values in the image with the encoder(s) 402 to yield a feature vector 408 to be input to the machine learning training engine 406. Such processing may further enhance the ability of the machine learning training engine 406 to yield predictive model(s) 404 that can accurately predict species of fishes based on subsequently acquired images.

Once a predictive model 404 has been generated, it may be used to evaluate filet images 412 acquired by an end user's device (e.g., a smartphone 310 with a camera) and to cause the end user's device to provide an output (corresponding to a species ID 410) indicating the determined species of the imaged filet. In some implementations, the predictive model(s) 404 may be transferred to and stored locally on the end user's device. In such implementations, the end user's device need not be connected to a network to be able to evaluate newly-acquired image data using the predictive model(s) 404, thus enabling real-time fish species identification while at remote locations or while at sea. In other implementations, the predictive model(s) 404 may be installed on a remote computing device/system that is accessible to such an end user's device. For instance, in some implementations, the predictive model(s) 404 may reside on one or more servers accessible to an end user's device or may be located within a cloud computing environment. In any event, no matter where the predictive model(s) 404 reside, a user may operate an end user's device to acquire an image of a fish filet and provide the acquired image to the predictive model(s) 404 for processing. Where the predictive model(s) 404 reside on one or more server(s) or in cloud computing environment, for example, the end user's device may send the acquired image over a network, e.g., the Internet, to the device(s) on which the trained predictive model(s) 404 reside. The acquired image may then be processed to encode it (e.g., using the encoder(s) 402, into a feature vector 408 (similar to the way the filet images 412 used for training were processed) and such a feature vector 408 may then be evaluated by the trained predictive model(s) 404 to identify the species of the imaged filet. An indication of the identified species may then be returned to the user device for display to the user. In other implementations, all of the foregoing processing of a filet image 412 acquired by an end user's device to determine the species of the imaged filet may be performed locally on the end user's device, e.g., by one or more encoders 402 and one or more predictive models 404 present on the end user's device.

As noted above, in some implementations, an application ("app") may be provided on the end user's device to facilitate the process of acquiring and providing/sending filet images 412 to the predictive model(s) 404 for processing, as well as displaying the results of that processing, e.g., an identified fish species, to the user. For example, after launching such an app on the end user's device, the user may simply point the device's camera at a particular filet and click a button (or otherwise provide an input) to begin the image acquisition/analysis process. In response to providing such an input, the end user's device may promptly display an indication of the identified species of the imaged filet. In other implementations, the application may prompt the user to use the end user's device to take a photograph or select a photograph from a collection of previously taken images stored on the end user's device, and that photograph may then be provided/sent to the predictive model(s) 404 for processing as described above.

In some embodiments, the end user's device may further output additional information describing one or more features and/or characteristics of the identified species. For example, in some implementations, certain information about the identified species may be acquired from an actively updated data repository for such purposes, such as to obtain a current average market price for the particular species of fish, to learn of current health warnings relating to the species, etc.

In some implementation, such an application may additionally or alternatively provide a streamlined mechanism for reporting mislabeled filets to an appropriate authority. Such a mechanism may, for example, be able to access global positioning system (GPS) data from the end user's device and append such data to a message that may be sent to a predetermined destination, together with information concerning the determined species. Such a message may also include information about the inaccurate labeling applied to the filet, perhaps in the form of a second image of the label itself.

Figure 5:
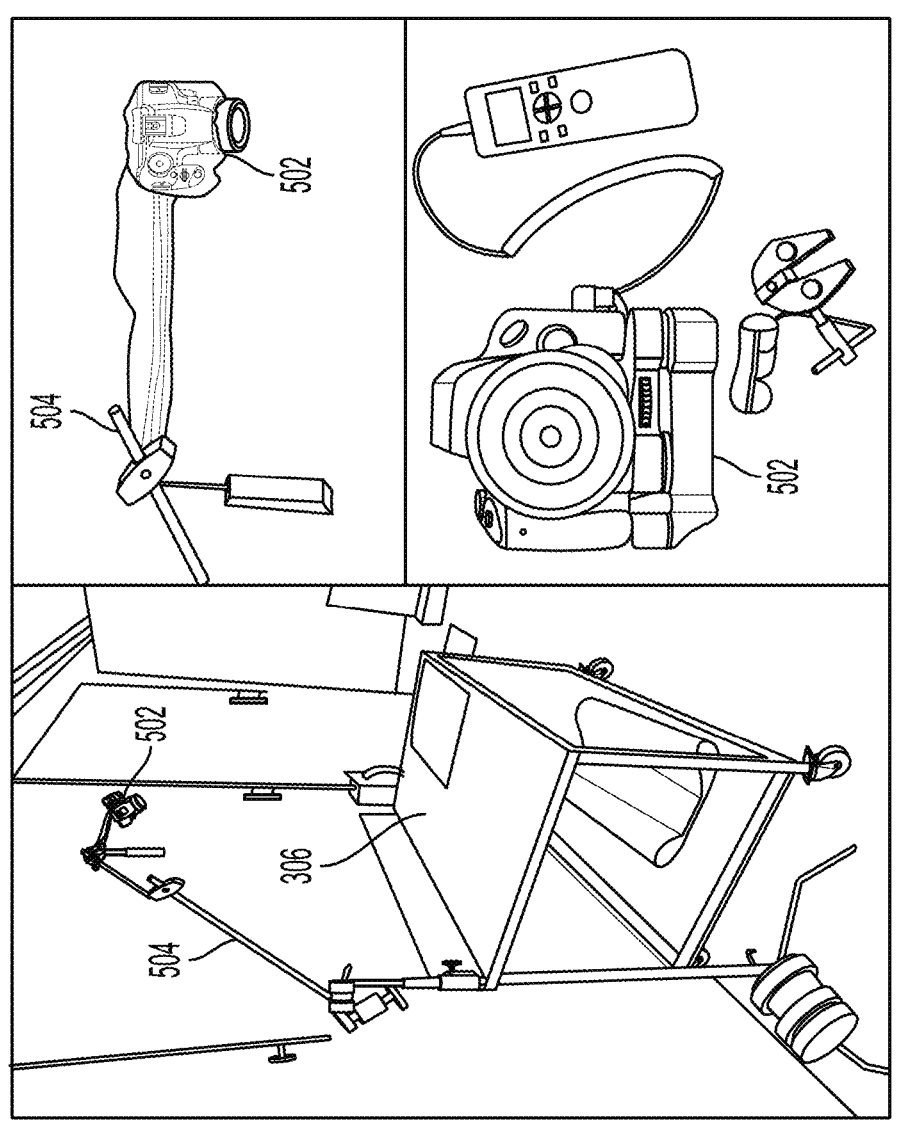
FIG. 5 shows annotated photographs of an example system for capturing images of fish filets with a camera as they are cut.
Figure 6:
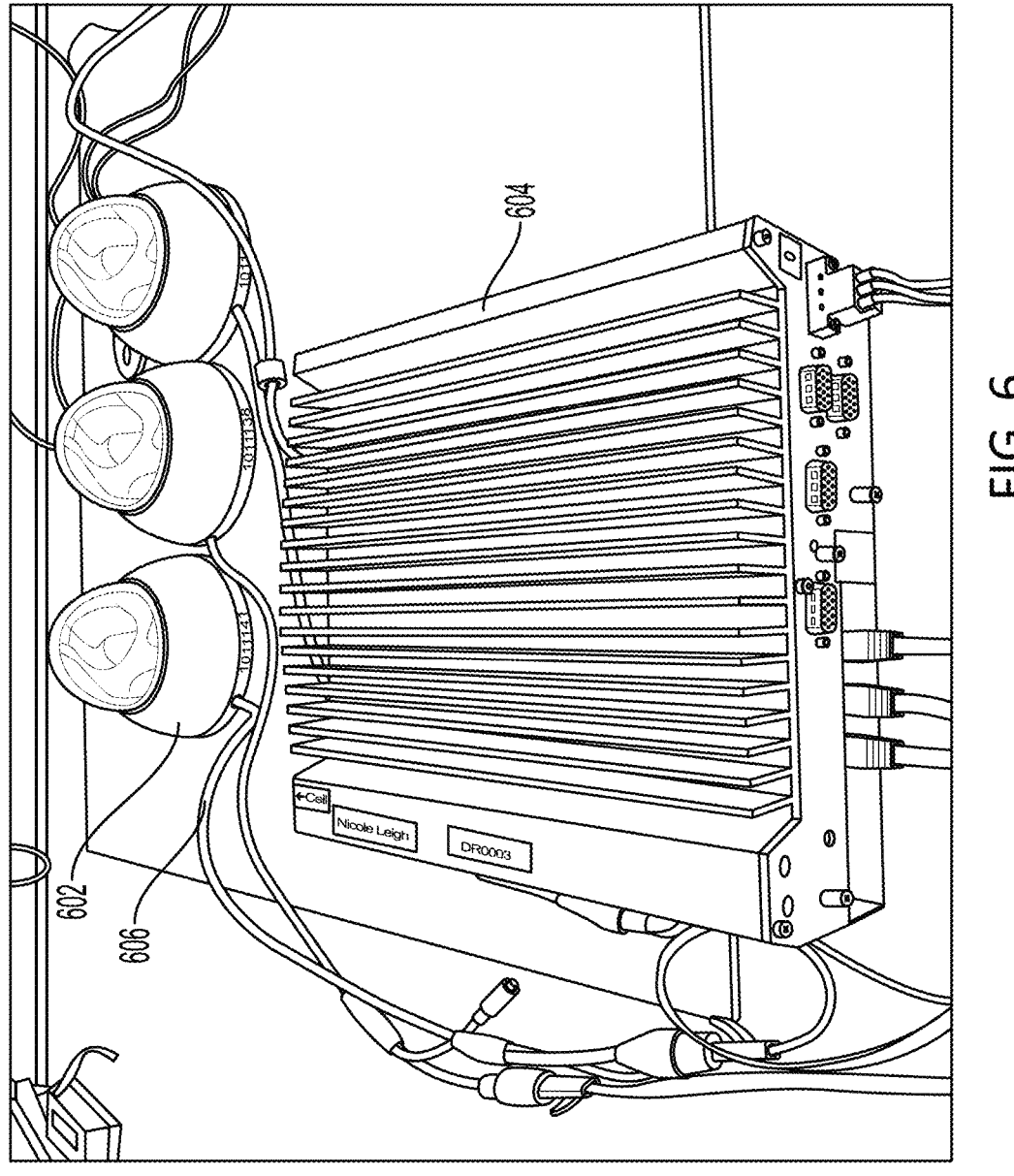
FIG. 6 is an annotated photograph showing several machine vision cameras that may be used to acquire images of fish filets in some implementations, as well as a central server to which such cameras may be connected.

As noted above in connection with FIG. 3, in some implementations, the automated filet identification system 300 may include one or more imaging systems 302, e.g., high-resolution cameras, to record high volumes of images of fish filets 200. In one example configuration, for instance, the imaging system(s) 302 may include at least one Canon Rebel T7i DSLR and intervalometer and a dual battery connector set to take a high resolution burst of images periodically, e.g., every two seconds. FIG. 5 is a set of three photographs showing such a camera 502 and the manner in which it may be mounted (e.g., with an articulating arm 504) over a cutting table 306 used to cut fish filets 200. Another example configuration of the one or more imaging systems 302 is shown in FIG. 6. As shown in FIG. 6, in such a configuration, one or more machine vision cameras 602 may be connected to a central server 604, e.g., wirelessly or via one or more Ethernet cables 606. The camera(s) 602 may, for example, be mounted above the ideal location in the fish cutting processing line. In some implementations, the server 604 may run multiple cameras 602 to provide ample data collection throughout the facility. In some implementations, the system may also be connected to a wireless network to enable remote technical support and data transfer to reduce costs of data collection.

In some implementations, one imagery has been collected by imaging system(s) 302, it may be uploaded into a suitable computing system, such as CVision AI's cloud-based instance of Tator Online, where personnel may tag screen shots of filets or tagging may be performed automatically, as described above. An example screen shot 702 including an image of a filet that may be so tagged is shown in FIG. 7. As illustrated, in some implementations, a written label 704 or other indicator identifying a fish species may be placed in the field of view of the imaging system(s) 302 as filets of that species are being cut to facilitate the subsequent tagging of data. Additionally or alternatively, as noted above, in some implementations, contemporaneously acquired images of the whole fish being cut may be used for species identification during the tagging process (which may be either manual or automated), as discussed above.

Figure 8:
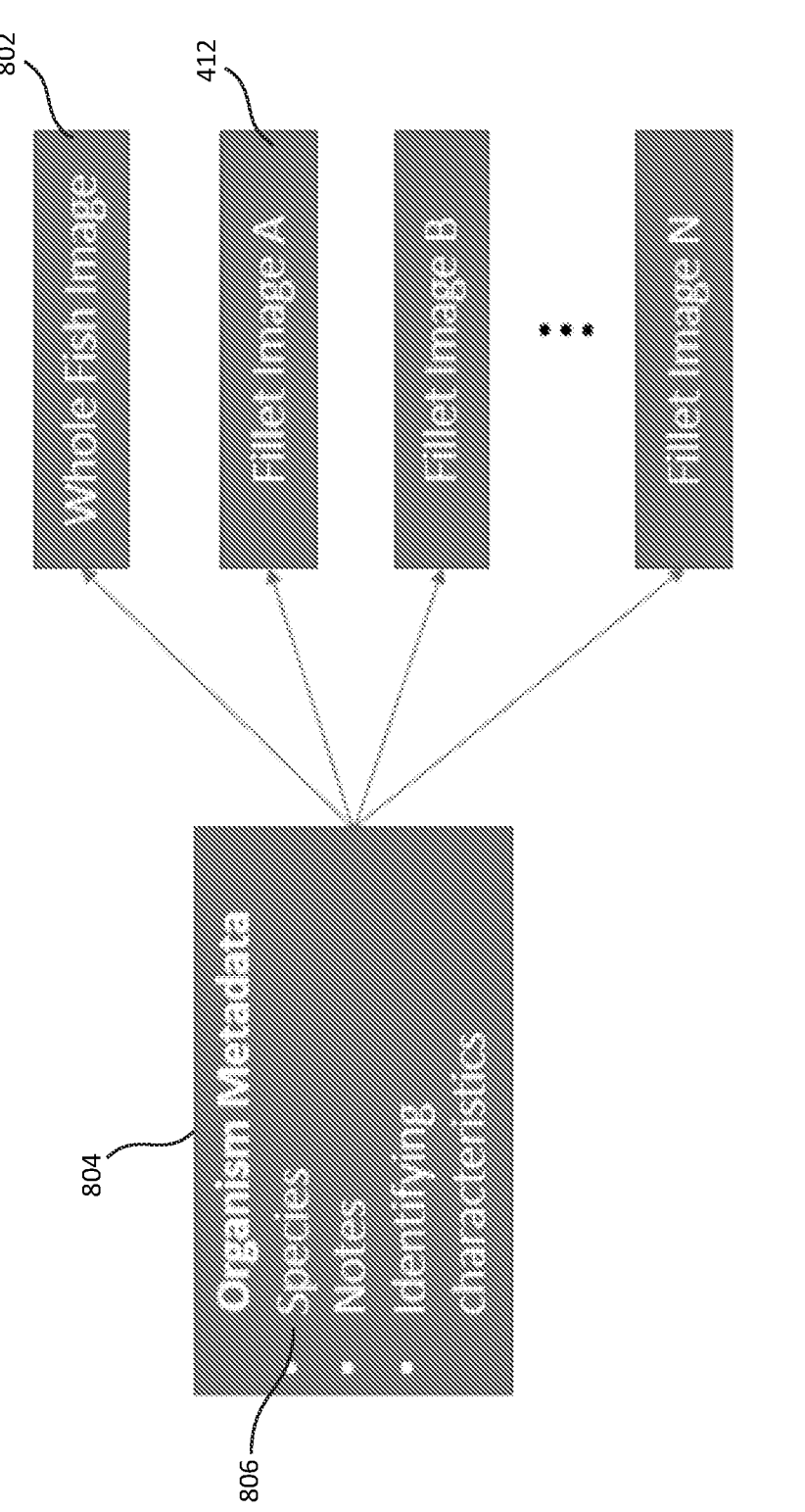
FIG. 8 shows an example of how collected information, including one or more filet images, a whole fish image, and associated metadata, including species annotations as well as other metadata, may be organized.
Figure 9:
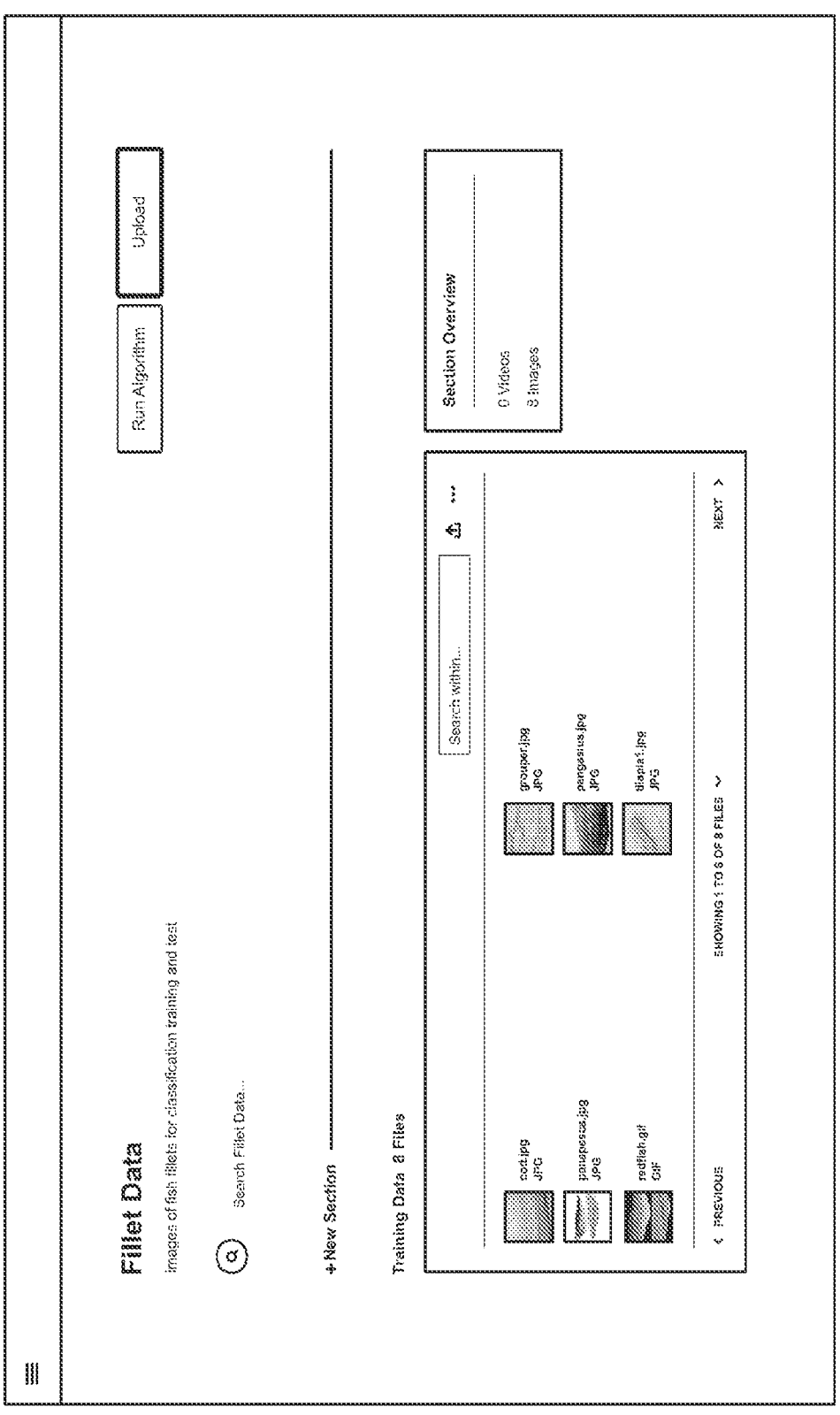
FIG. 9 is an image of a computer screen showing thumbnail versions of several fish filet images that have been uploaded to an online platform so that they may be used to train one or more predictive models.

FIG. 8 shows an example of how the collected information, including one or more filet images 412, a whole fish image 802, and associated metadata 804, including species annotations 806 as well as other metadata, may be organized. Tator Online is an example of a system that supports this type of media cross referencing, as well as custom fields for adding key point identifiers, and rich notes about identifying characteristics. FIG. 9 shows how a computer screen may appear when several filet images 412 have been loaded into Tator Online. Use of such a system may allow the addition of metadata for future ID notes, as well as the ability to associated filet images 412 with whole fish images 802, and may also provide an auditable data set.

Figure 10:
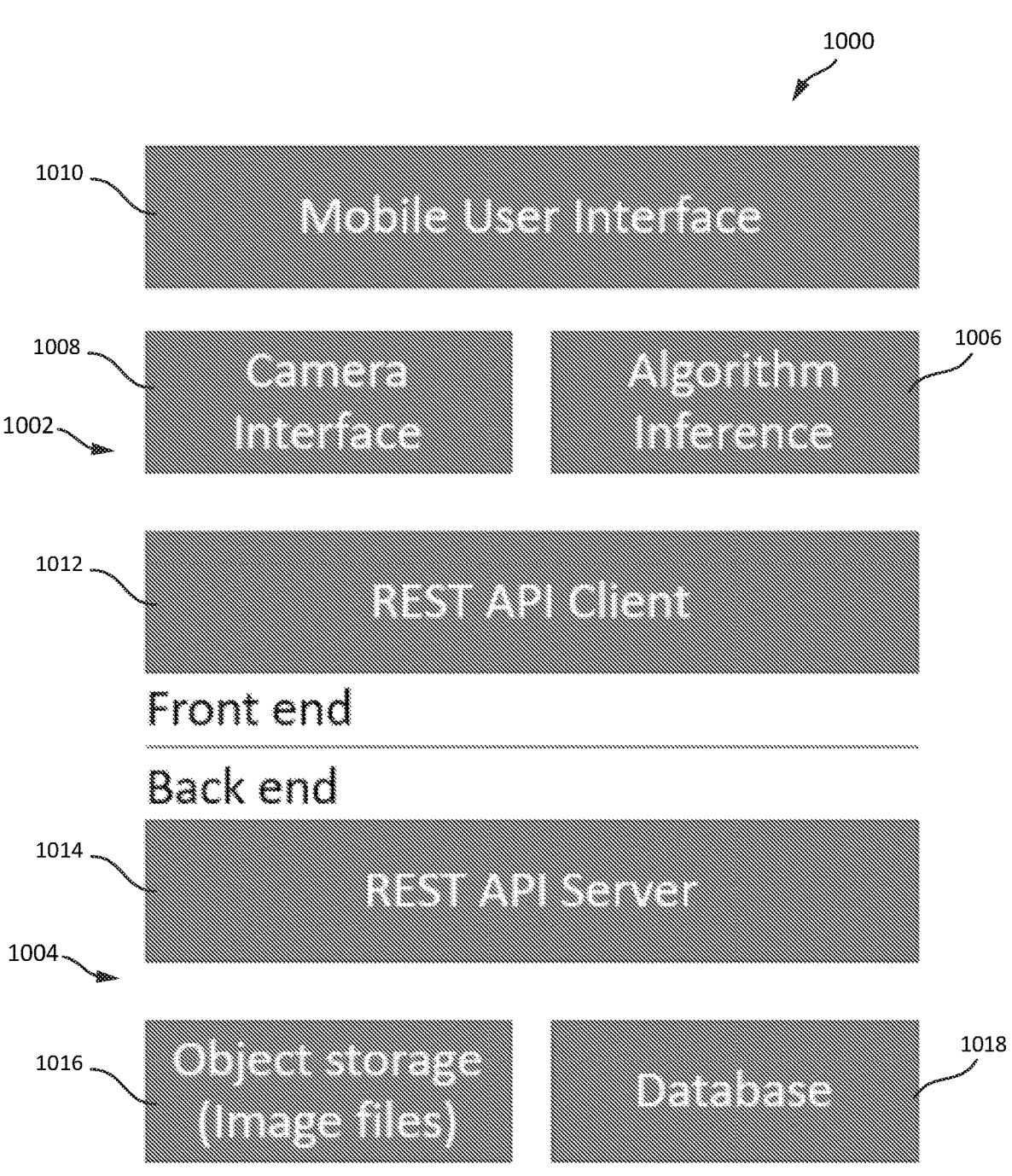
FIG. 10 is a block diagram of an example application that may allow a camera of an end user's device to collect a filet image, run that image through one or more predictive models used for species identification, and cause the end user's device to output an indication of the identified species.

As noted above, in some implementations, an application may be provided that allows a camera of an end user's device (e.g., a smartphone 310, tablet, etc.) to collect a filet image 412, run that image through one or more predictive models 404 used for species identification, and cause the end user's device to output an indication of the identified species. A block diagram of an example implementation of such an application 1000 is shown in FIG. 10. As shown, the application 1000 may include a front end 1002 (e.g., located on a mobile device) and a back end 1004 (e.g., located on one or more servers). The front end 1002 may, for example, be implemented as an Android application, an iOS, etc. In some implementations, an algorithm inference module 1006 of the front end 1002 may leverage TensorFlow Lite, a deployment framework for mobile applications. Such a framework is described, for example, at the path "/lite/guide" of the URL "tensorflow.org," the entire contents of which are incorporated herein by reference. Such a framework may allow for local inference on the mobile device, leveraging hardware optimizations where possible for minimal latency between image acquisition (e.g., via a camera interface 1008) and species identification (e.g., via a mobile user interface 1010). In some implementations, the mobile application (e.g., the front end 1002) may function without any internet connectivity, enabled by the local algorithm inference module 1006. Such implementations may allow for usage in remote locations or while at sea. However, for traceability and analytics, the mobile application (e.g., the front end 1002) may be capable (e.g., with user opt-in) of uploading image data and inference results to a server or cloud-based back end, e.g., the back end 1004 shown in FIG. 10. Other metadata may also be sent to the back-end 1004, such as geo-tags of images, device information, and user information. Geo-tagging information may be valuable in evaluating inference results; for example, if the identified species is not sold in the area where the picture was taken, that species may be excluded from possible classifier outputs.

In some implementations, communications between the front end 1002, e.g., on a mobile device, and the backend 1004 may be achieved through a representational state transfer application programming interface (REST API) (e.g., via REST API client 1012 and REST API server 1014 in FIG. 10) using an OpenAPI compliant specification. Such a specification is posted, for example, at the path "specification" of the URL "swagger.io," the entire contents of which are incorporated herein by reference. The use of such a REST API may allow for rapid deployment of server-side endpoint stubs as well as client code for Java, the native programming language for Android. In some implementations, the REST interface may be fairly simple, composed of a handful of endpoints for generating pre-assigned URLs from an object storage back end module 1016 and creating new records in a database 1018 that contain, for example, inference results, object storage keys to imagery, and metadata.

In some implementations, the back end 1004 may run on a cloud service and may leverage managed object storage (such as Amazon S3 or Google Cloud Storage) and database services (such as Amazon RDS or Google Cloud SQL) to ensure data durability and availability. To ensure scalability of the REST service, an API deployment service such as API Gateway may be used. The API may, for example, be implemented using a lightweight framework such as Fast API.

Prototype Implementation

This section describes a prototype implementation of an automated fish filet identification system such as that described herein, as well as preliminary results obtained using such that system. The system employed had a modular design and was deployed in a fish cutting house to capture images of fish filets 200. Images were captured using a camera 502 mounted over a cutting table 306, as shown in FIG. 5, and image data for fish filets 200 taken by the camera 502 was uploaded into a Tator Online platform, e.g., as shown in FIG. 7, where annotations were created for the respective filet images 412 represented by that data. The camera 502 (i.e., a Canon Rebel T7i DSLR and intervalometer and a dual battery connector) was set to take a high resolution burst of images every two seconds. A protocol was communicated with the cutting crew to enable the best possible data capture while not interrupting their workflow in any material way. In addition, as the species processed by the house could vary throughout the day, a species block 706 including a written label 704 was created to be placed in view of the filet while cutting as an extra assurance for species identification.

The goal of this effort was to create an algorithm that could classify a filet image 412 into one of "N" categories, or "uncertain." In addition, the architecture was devised to be computationally cheap, to be available on common hardware, and to take advantage of connectivity afforded by edge devices such as a smartphone or tablet. To achieve these goals, an algorithm architecture called MobileNets was employed. The MobileNets algorithm architecture is described, for example in a document entitled "MobileNets: Efficient Convolutional Neural Networks for Mobile Vision Applications," which can be accessed at the path "/pdf/1704.04861.pdf" of the URL "arxiv.org," the entire contents of which is incorporated herein by reference. This architecture, implemented in Tensorflow, was created for exactly the inference efficiency that was desired. Utilizing Transfer Learning (e.g., as described in S. J. Pan and Q. Yang, "A Survey on Transfer Learning," *IEEE Transactions on Knowledge and Data Engineering*, vol. 22, no. 10, pp. 1345-1359, 2010, the entire contents of which is incorporated by reference), a model ensemble on three classes (Atlantic Cod, Haddock, and Pollock) was created. The ensemble method was inspired by works to characterize uncertainty in Convolutional Neural Networks. The intuition behind the model ensemble allowed models that are "confidently wrong" to be avoided.

Twenty one data collections were performed using the camera setup shown in FIGS. 5 and 7. A total of approximately "180,000" photos were reviewed, resulting in "2,279" annotations of approximately "1,000" unique fish. To train the algorithm, the data was partitioned into an "80/10/10" train/validate/test split, as shown in Table 1 below.

TABLE 1

| Split | Species | | |
| | Atlantic-Cod | Haddock | Pollock |
| --- | --- | --- | --- |
| Train | 530 | 322 | 900 |
| Validate | 67 | 52 | 82 |
| Test | 49 | 39 | 116 |

Four predictive models 404 were trained for the ensemble. For each predictive model 404, "25" Monte Carlo dropout runs were used during inference, resulting in "100" separate inference runs for each image. To get the final score vectors, the average of these "100" separate runs was taken. The class for an image was determined by the maximum score of the three classes. In addition, the uncertainty was measured by the entropy of the distribution between the three classes. The equation for entropy is shown in Equation 1 below:

$$-1 * \sum_{x=1}^{N} x * \log_e x \qquad \text{Equation 1}$$

In Equation 1, the sum is over the components of the score vector. The maximum of this distribution is when all three components are equal, reflecting a case of maximum uncertainty, and the minimum is when one of the components is "1.0" and the others are zero. The algorithm achieved 99% accuracy in training and validation, and 100% accuracy over the test set.

These results thus demonstrate the ability to visually distinguish between species of fish filets.

Example Computing Environment

Figure 11:
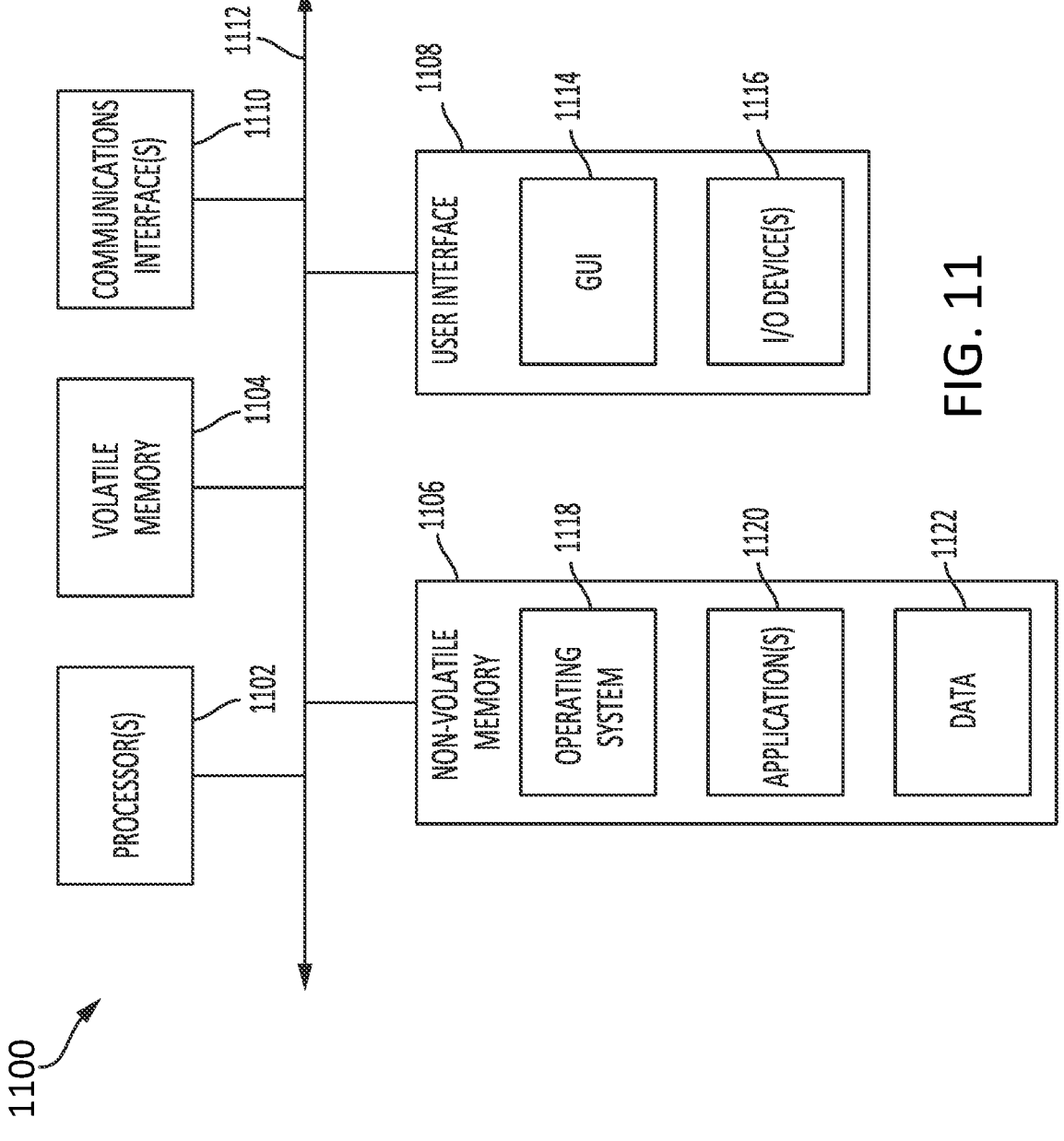
FIG. 11 is a block diagram of a computing system that may be used implement various aspect of the present disclosure.

FIG. 11 illustrates an example of a computing system 1100 that may be used to implement one or more of the respective computing components of the automated filet identification system 300 described herein, such as the computing system 308 and/or the smartphone 310 (or other end user's device) shown in FIG. 3, the system 400 for training and using one or more predictive models 404 shown in FIG. 4, and/or the server system 604 shown in FIG. 6, as well as to execute the front end 1002 and the back end/or the back end 1004 of the application 1000 shown in FIG. 10. As shown in FIG. 11, the computing system 1100 may include one or more processors 1102, volatile memory 1104 (e.g., RAM), non-volatile memory 1106 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 1108, one or more communications interfaces 1110, and a communication bus 1112. The user interface 1108 may include a graphical user interface (GUI) 1114 (e.g., a touchscreen, a display, etc.) and one or more input/output (I/O) devices 1116 (e.g., a mouse, a keyboard, camera, etc.). The non-volatile memory 1106 may store an operating system 1118, one or more applications 1120, and data 1122 such that, for example, computer instructions of the operating system 1118 and/or applications 1120 are executed by the processor(s) 1102 out of the volatile memory 1104. Data may be entered using an input device of the GUI 1114 or received from I/O device(s) 1116. Various elements of the computing system 1100 may communicate via communication bus 1112. The computing system 1100 as shown in FIG. 11 is shown merely as an example, as the various computing components and/or applications described herein may be implemented by any computing or processing environment and with any type of machine or set of machines that may have suitable hardware and/or software capable of operating as described herein.

The processor(s) 1102 may be implemented by one or more processors executing one or more computer programs (e.g., stored on one or more computer-readable mediums) to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), micro-processors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 1110 may include one or more interfaces to enable the computing system 1100 to access a computer network such as a Local Area Network (LAN), a Wide Area Network (WAN), a Personal Area Network (PAN), or the Internet through a variety of wired and/or wireless connections, including cellular connections.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

acquiring, using a digital camera, a first image of a first fish filet;

encoding the first image into a first feature vector consumable by at least one predictive model, wherein at least one predictive model includes a machine learning model that is trained, using previously acquired images of second fish filets and corresponding labels indicative of types of fish from which the second fish filets were cut, to classify images of fish filets into two or more categories corresponding to the types of fish;

processing, with the at least one predictive model, the first feature vector to identify a first type of fish from which the first fish filet was cut; and causing at least one device to output an indication of the first type of fish identified by the at least one predictive model.

2. The method of claim 1, further comprising:

associating a second image, included among the previously acquired images, with a third image of a whole fish from which one of the second fish filets was cut;

determining, based on the third image, that the whole fish is of the first type;

determining, based on the second image being associated with the third image, that the one of the second fish filets is of the first type;

associating the second image with a first tag indicating that the second image is of a fish filet cut from a fish of the first type;

encoding the second image into a second feature vector consumable by the at least one predictive model; and using the second feature vector and the first tag to train the machine learning model.

3. The method of claim 1, further comprising:

disposing an indicator of the first type of fish at a location where one of the second fish filets is to be cut;

acquiring a second image of the one of the second fish filets that includes a representation of the indicator;

determining, based on the indicator represented in the second image, that the one of the second fish filets was cut from a fish of the first type;

associating the second image with a first tag indicating that the second image is of a fish filet cut from a fish of the first type;

encoding the second image into a second feature vector consumable by the at least one predictive model; and using the second feature vector and the first tag to train the machine learning model.

4. The method of claim 1, wherein:

the at least one device includes a mobile device operated by a user;

the mobile device includes the digital camera used to acquire the first image; and the at least one predictive model resides on the mobile device.

5. The method of claim 1, wherein the at least one device includes a mobile device operated by a user, the mobile device includes the digital camera used to acquire the first image, and the at least one predictive model resides on a remote computing system, and the method further comprises:

receiving, by the remote computing system and from the mobile device, the first image; and sending, from the remote computing system to the mobile device, the indication of the first type of fish.

6. A method, comprising:

acquiring, with a digital camera of a mobile device, a first image of a first fish filet;

causing the first image to be processed by at least one predictive model to identify a first type of fish from which the first fish filet was cut, wherein at least one predictive model includes a machine learning model that is trained, using previously acquired images of second fish filets and corresponding labels indicative of types of fish from which the second fish filets were cut, to classify images of fish filets into two or more categories corresponding to the types of fish; and outputting, with the mobile device, an indication of the first type of fish.

7. The method of claim 6, further comprising:

associating a second image, included among the previously acquired images, with a third image of a whole fish from which one of the second fish filets was cut;

determining, based on the third image, that the whole fish is of the first type;

determining, based on the second image being associated with the third image, that the one of the second fish filets was cut from a fish of the first type;

associating the second image with a first tag indicating that the second image is of a fish filet cut from a fish of the first type;

encoding the second image into a second feature vector consumable by the at least one predictive model; and using the second feature vector and the first tag to train the machine learning model.

8. The method of claim 6, further comprising:

disposing an indicator of the first type of fish at a location where one of the second fish filets is to be cut;

acquiring a second image of the one of the second fish filets that includes a representation of the indicator;

determining, based on the indicator represented in the second image, that the one of the second fish filets was cut from a fish of the first type;

associating the second image with a first tag indicating that the second image is of a fish filet cut from a fish of the first type;

encoding the second image into a second feature vector consumable by the at least one predictive model; and using the second feature vector and the first tag to train the machine learning model.

9. The method of claim 6, wherein the at least one predictive model resides on the mobile device.

10. The method of claim 6, wherein the at least one predictive model resides on a remote computing system, and the method further comprises:

sending, from the mobile device to the remote computing system, the first image of the first fish filet; and receiving, by the mobile device and from the remote computing system, the indication of the first type of fish.

11. A system, comprising:

at least one processor; and at least one computer-readable medium encoded with instructions which, when executed by the at least one processor, cause the system to:

acquire, using a digital camera, a first image of a first fish filet, encode the first image into a first feature vector consumable by at least one predictive model, wherein at least one predictive model includes a machine learning model that is trained, using previously acquired images of second fish filets and corresponding labels indicative of types of fish from which the second fish filets were cut, to classify images of fish filets into two or more categories corresponding to the types of fish;

process, with the at least one predictive model, the first feature vector to identify a first type of fish from which the first fish filet was cut, and cause at least one device to output an indication of the first type of fish identified by the at least one predictive model.

12. The system of claim 11, wherein the at least one computer-readable medium is further encoded with additional instructions which, when executed by the at least one processor, further cause the system to:

associate a second image, included among the previously acquired images, with a third image of a whole fish from which one of the second fish filets was cut;

determine, based on the third image, that the whole fish is of the first type;

determine, based on the second image being associated with the third image, that the one of the second fish filets was cut from a fish of the first type;

associate the second image with a first tag indicating that the second image is of a fish filet that was cut from a fish of the first type;

encode the second image into a second feature vector consumable by the at least one predictive model; and use the second feature vector and the first tag to train the machine learning model.

13. The system of claim 11, wherein the at least one computer-readable medium is further encoded with additional instructions which, when executed by the at least one processor, further cause the system to:

acquire a second image of one of the second fish filets that includes a representation of an indicator of the first type of fish that is disposed at a location where the one of the second fish filets is being cut;

determine, based on the indicator represented in the second image, that the one of the second fish filets was cut from a fish of the first type;

associate the second image with a first tag indicating that the second image is of a fish filet that was cut from a fish of the first type;

encode the first image into a second feature vector consumable by the at least one predictive model; and use the second feature vector and the first tag to train the machine learning model.

14. The system of claim 11, wherein:

the at least one device includes a mobile device operated by a user; and the at least one predictive model resides on the mobile device.

15. The system of claim 11, wherein the at least one device includes a mobile device operated by a user and the at least one predictive model resides on a remote computing system, and the at least one computer-readable medium is further encoded with additional instructions which, when executed by the at least one processor, further cause the system to:

receive, by the remote computing system and from the mobile device, the first image; and send, from the remote computing system to the mobile device, the indication of the first type of fish.

16. A mobile device, comprising:

a digital camera;

a display;

at least one processor; and at least one computer-readable medium encoded with instructions which, when executed by the at least one processor, cause the mobile device to:

cause the digital camera to acquire a first image of a first fish filet, cause the first image to be processed by at least one predictive model to identify a first type of fish from which the first fish filet was cut, wherein at least one predictive model includes a machine learning model that is trained, using previously acquired images of second fish filets and corresponding labels indicative of types of fish from which the second fish filets were cut, to classify images of fish filets into two or more categories corresponding to the types of fish, and cause the display to output an indication of the first type of fish.

17. The mobile device of claim 16, wherein the at least one predictive model resides on the mobile device.

18. The mobile device of claim 16, wherein the at least one predictive model resides on a remote computing system, and the at least one computer-readable medium is further encoded with additional instructions which, when executed by the at least one processor, further cause the mobile device to:

send, to the remote computing system, the first image of the first fish filet; and receive, from the remote computing system, the indication of the first type of fish.

* * * * *